J. M. DALY, DEC'D.
C. M., R. J. AND M. DALY, HEIRS-AT-LAW.
APPARATUS FOR STORING AND TRANSPORTING VEHICLES.
APPLICATION FILED MAR. 7, 1917.
1,324,105.
Patented Dec. 9, 1919.
4 SHEETS—SHEET 2.
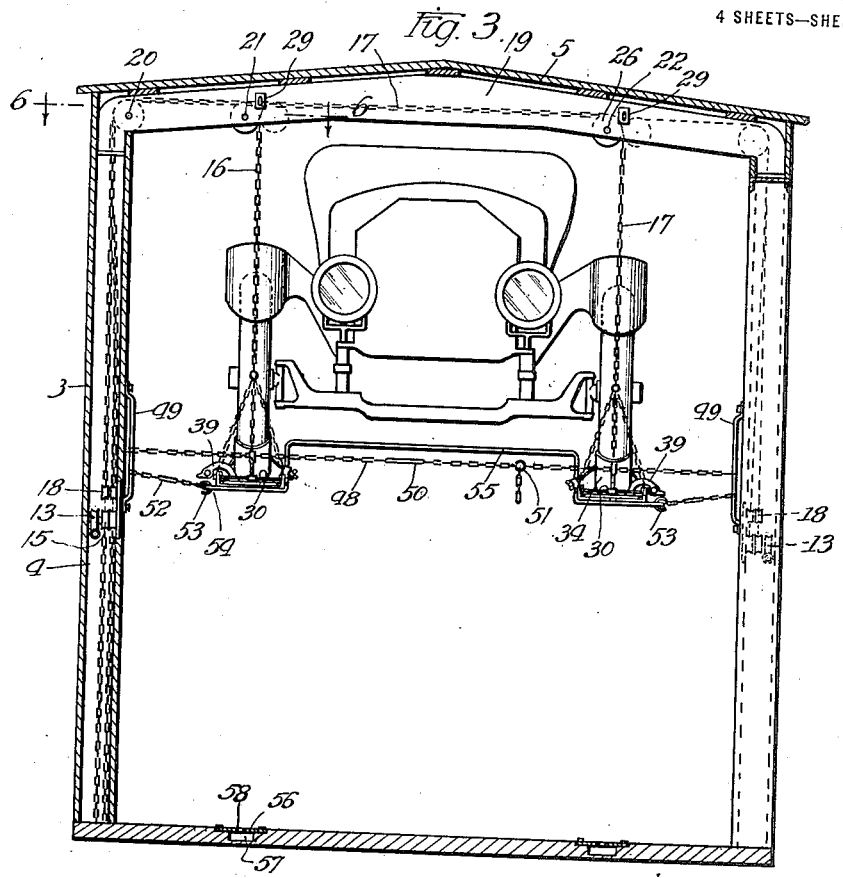
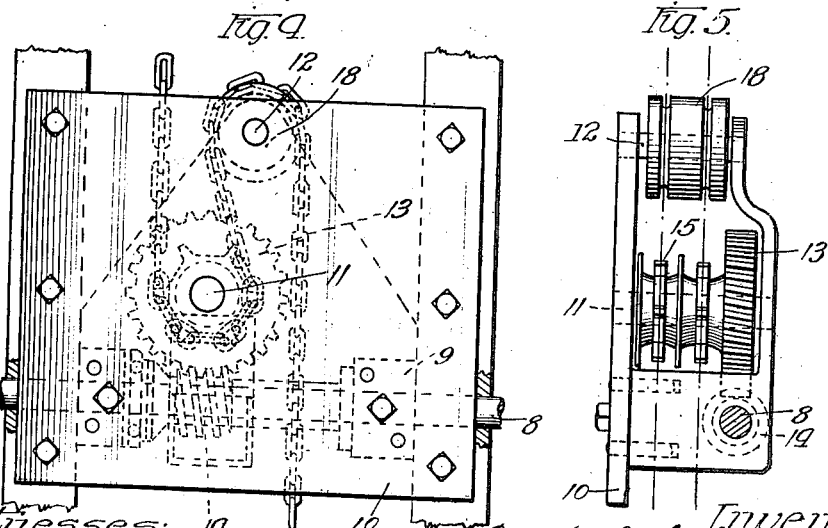
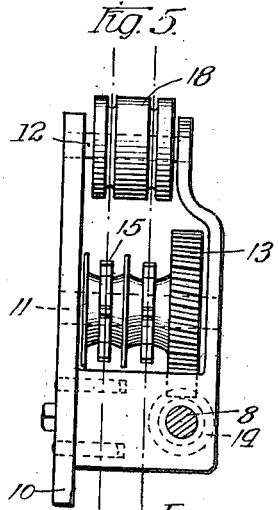

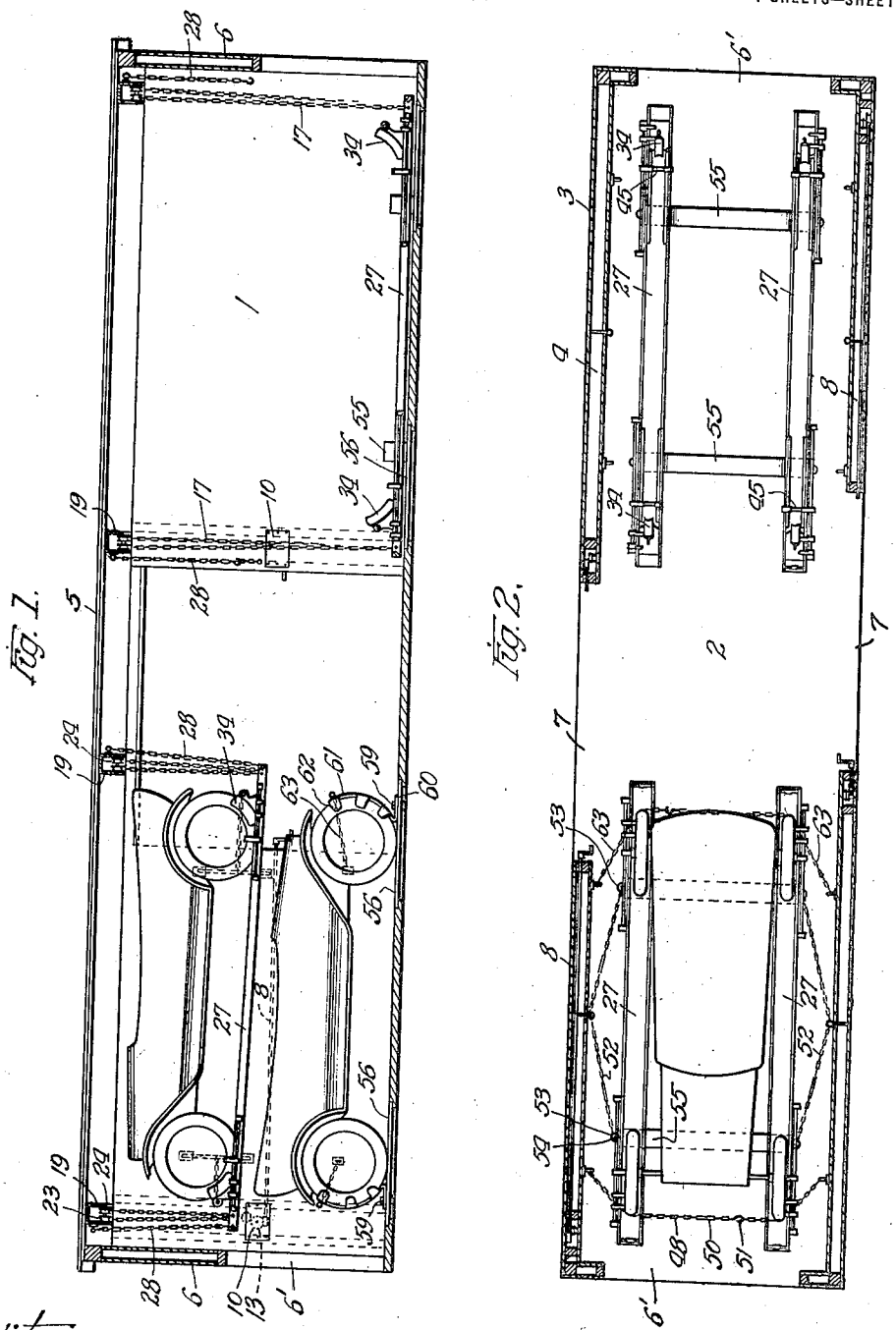

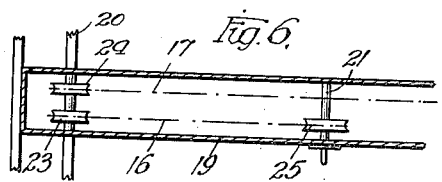
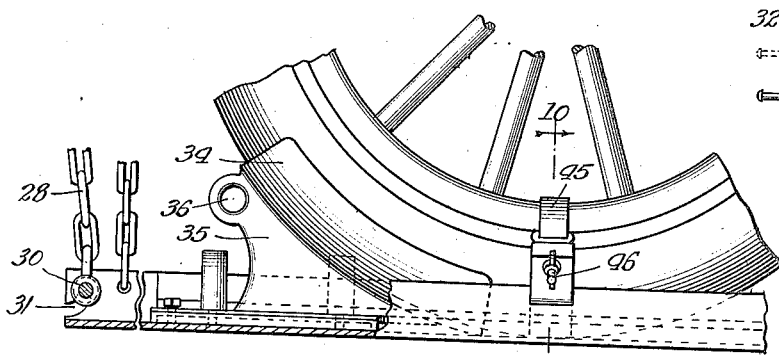
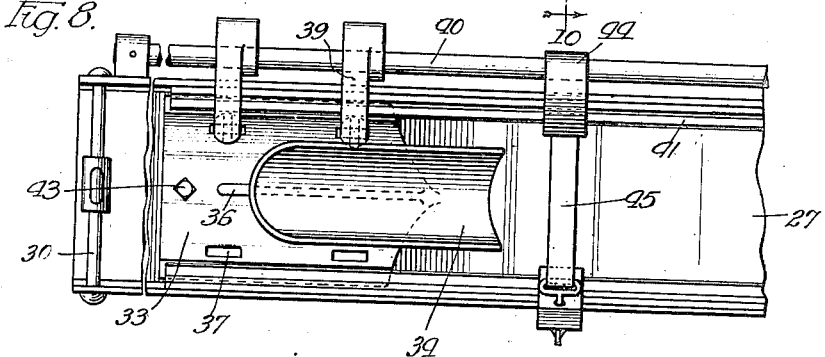
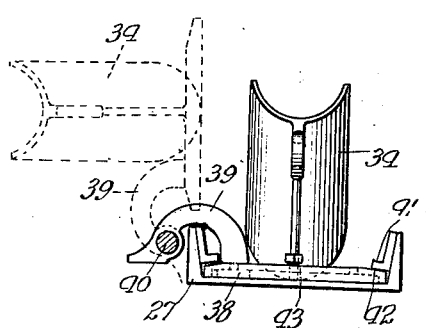
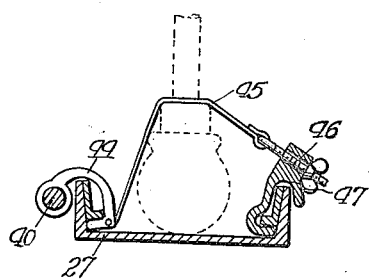

J. M. DALY, DEC'D.
C. M., R. J. AND M. DALY, HEIRS-AT-LAW.
APPARATUS FOR STORING AND TRANSPORTING VEHICLES.
APPLICATION FILED MAR. 7, 1917.
1,324,105.
Patented Dec. 9, 1919.
4 SHEETS—SHEET 4.
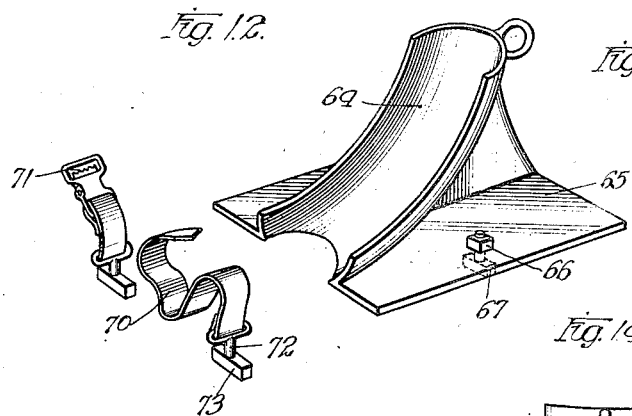
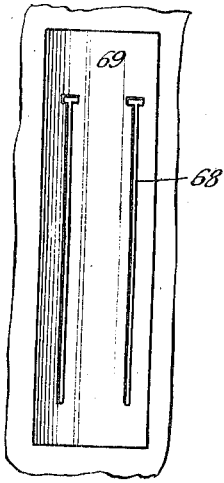
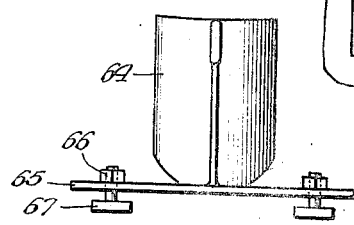
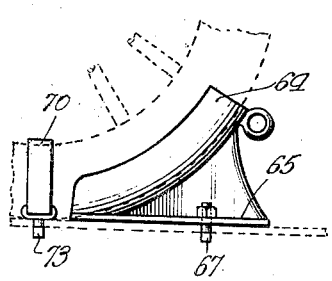
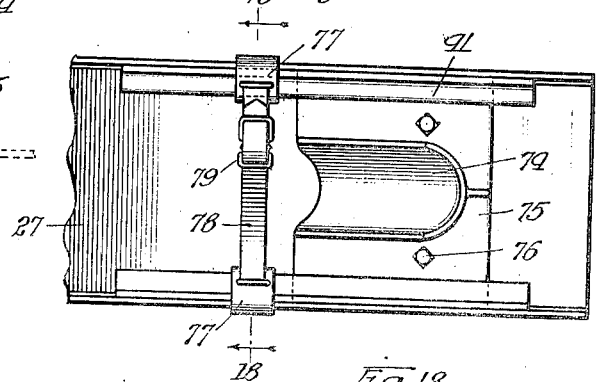
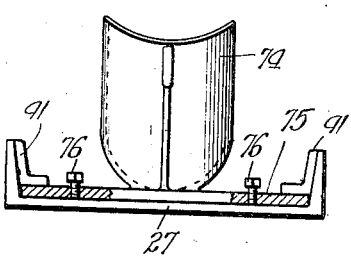
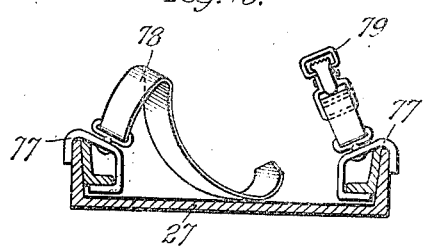

UNITED STATES PATENT OFFICE.

JOHN M. DALY, DECEASED, LATE OF CHICAGO, ILLINOIS, BY CORA M. DALY, RAYMOND J. DALY, AND MARION DALY, HEIRS-AT-LAW, ALL OF CHICAGO, ILLINOIS.

APPARATUS FOR STORING AND TRANSPORTING VEHICLES.

1,324,105.      Specification of Letters Patent.      Patented Dec. 9, 1919.

Application filed March 7, 1917. Serial No. 153,183.

*To all whom it may concern:*

Be it known that JOHN M. DALY, deceased, late a citizen of the United States, residing at Chicago, Cook county, Illinois, has invented new and useful Improvements in Apparatus for Storing and Transporting Vehicles, of which the following is a specification.

This invention relates to improvements in an apparatus for storing and transporting vehicles, and has for its object the provision of appliances adapted to be installed in a railway car or other medium of transportation, for the economic loading and transportation of vehicles, particularly motor vehicles, therein, being directed to the same art as disclosed and claimed in the co-pending application filed February 9th, 1916, bearing Serial Numbers 77,308, patented October 29, 1918, No. 1,282,764, 77,309, patented October 16, 1917, No. 1,243,141, 77,310, patented October 29, 1918, No. 1,282,765, and 77,311, patented November 20, 1918, No. 1,247,230, another co-pending application filed March 14th, 1916, bearing Serial Number 84,043, patented October 29, 1918, No. 1,282,766, and another co-pending application filed May 15th, 1916, and bearing Serial Number 97,669, patented December 25, 1917, No. 1,250,982.

A further object of this invention is the provision of appliances in a car for lifting vehicles to a raised position and means for securely holding the vehicles in their raised position and also thereunder, so that a plurality of vehicles may be stacked within the car in tiers and securely supported in position so as to obviate the possibility of damage and injury due to the movement of the vehicles within the car during transportation, whereby the effective capacity of the car is increased.

Another object of this invention is the provision of an improved raising and lowering means and arrangement, and also an improved means for holding the vehicles securely in position during transportation.

Other objects of invention include improvements in details of construction and arrangement whereby a simple and efficient mechanism is provided to accomplish the results herein set forth.

To the accomplishment of the foregoing and such other objects as may hereinafter appear, this invention consists in the construction, combination and arrangement of parts hereinafter specified and then sought to be defined in the appended claims, reference being had to the accompanying drawings forming a part hereof and which show merely for the purpose of illustrative disclosure, a preferred embodiment of this invention, it being expressly understood that various changes may be made in practice within the scope of the claims without digressing from the inventive idea defined therein.

In the drawings:—

Figure 1 represents a longitudinal section of a car equipped with appliances embodying this invention, two vehicles being indicated in position in one end of the car.

Fig. 2 represents a transverse horizontal section through the car shown in Fig. 1 taken on a line above the upper vehicle.

Fig. 3 represents a vertical transverse section, taken through the car illustrated in Fig. 1 at an intermediate point;

Fig. 4 represents a view in side elevation of the preferred raising and lowering means used;

Fig. 5 represents a view in end elevation of the mechanism illustrated in Fig. 4;

Fig. 6 represents a horizontal section taken on line 6—6 of Fig. 3;

Fig. 7, represents, in an enlarged scale, a view in side elevation of part of a wheel of a vehicle and the end portion of the supporting and holding means therefor;

Fig. 8 represents a view in top plan of the structure illustrated in Fig. 7 with the wheel removed;

Fig. 9 represents an end view of the structure illustrated in Fig. 8, the open position of the holding shoe being indicated in dotted lines;

Fig. 10 represents a view in transverse section taken on line 10—10 of Fig. 7; and Fig. 11 represents a detail view of an auxiliary supporting means.

Fig. 12 is a perspective view of a slightly modified form of holding means to be used on the floor of a car;

Fig. 13 is a plan view of a plate placed in the floor of the car showing the locking slots;

Fig. 14 is an end elevation of the shoe shown in Fig. 12;

Fig. 15 is a side elevation of the shoe and holding means, the wheel being shown in dotted lines;

Fig. 16 is a plan view of part of the supporting means showing a slightly different form of holding means for bracing the vehicles which are raised or suspended;

Fig. 17 is an end elevation thereof, the supporting plate of the shoe being indicated in section;

Fig. 18 is a transverse cross-section taken on line 18—18 of Fig. 16.

As stated hereinbefore, this invention relates to the same class of constructions as disclosed in the pending applications previously referred to, and includes lifting frames with raising and lowering mechanism therefor, for raising and supporting vehicles in a raised position within a car, and coöperating means for securely holding the raised vehicles against movement during transit. Bracing and holding means are also provided for a lower row of vehicles, so that a plurality of vehicles may be loaded within a car, arranged in tiers one above the other. The raising and lowering means is so arranged also that one operator may raise or lower a vehicle.

Referring now to the drawings, the numeral 1 designates the car, which may be of the usual standard construction, having the floor 2, the sides 3 which are double walled to provide the spaces 4 therebetween; 5 designates the roof, 6 the double-walled ends having the door-ways 6', and 7 the usual side door-ways. These parts are of the customary construction and are mentioned merely for the purpose of facilitating disclosure and locating the parts.

Rotatably supported within the spaced side walls 3 are the longitudinally extending operating shafts 8, which are arranged in pairs on opposite sides, each shaft being adapted and having connections to raise and lower one end of a vehicle. Each shaft 8 is journaled in the bearing members 9 on the frame 10, which frame supports the short shafts 11 and 12, the former being provided with the worm gear 13 which meshes with the worm 14 on shaft 8. Shaft 11 is also provided with the pair of sprockets 15, which sprockets engage the links of the chains 16 and 17 which pass over the idler pulley 18 on shaft 12 so that they are held in engagement with the sprockets. It is obvious that when shaft 8 is rotated the chains will be moved for raising and lowering purposes.

Mounted in a suitable supporting means 19, which extends transversely across the car, are the shafts 20, 21 and 22. Two pulleys 23 and 24 are mounted on shaft 20, and single pulleys 25 and 26 on shafts 21 and 22. The chain 16 passes over pulleys 23 and 25 and is connected to the lifting and supporting means on the near side of the car, while chain 17 passes over pulleys 24 and 26 and is connected to the lifting and supporting means on the far side of the car, as indicated particularly in Fig. 3 of the drawings. The lifting and supporting means will now be described.

Each lifting and supporting means preferably includes the elongated channel member 27 disposed with its flanges extending upwardly and is of sufficient length to accommodate both wheels on one side of the vehicle to be supported, it being understood that each end of the channel member is connected to a pair of chains 16, 16 or a pair of chains 17, 17, and that they are arranged in pairs in spaced relation within the car so that both sides of the vehicle are supported in like fashion, and are raised and lowered in unison when the shaft 8 is operated. At each end of each channel member is also provided the auxiliary supporting means in the form of the chain 28 depending from eye 29 on the supporting means 19 and having the headed bar member 30 connected to its lower end for engagement in the curved slots 31 formed in the ends of the flanges of the channel member. The hook 32 is provided in this chain for the purpose of shortening it, as clearly shown in Fig. 11 of the drawings.

Each channel member is provided with an adjustable holding means at each end for engaging the wheel of the vehicle and securely holding the same, this holding means including the plate 33 having the curved shoe member 34 thereon with the bracing web 35 having the aperture 36, as shown clearly in Fig. 7 of the drawings. This plate 33 is mounted in the channel member so that it may slide for purposes of adjustment and may also be turned to a non-engaging position to permit the vehicle to be run onto the channel member. It is provided with the slots 37 adapted to receive the rotatable heads 38 of the fastening members mounted in the ends of the curved arms 39, which extend over the side of the channel member and are mounted on the shaft 40, which is suitably supported along the side of the channel member, as shown. Angle iron locking members 41 are positioned on the inside of the flanges of the channel members and spaced from the bottom thereof so as to permit the plate member to slide thereunder, the side portions of the plate member being beveled as at 42 to fit. Locking bolt 43 is provided in the plate member for holding it in adjusted position. The angle iron members 41 do not extend the full length of the shafts 40 but terminate short of the ends of the channel members so that when the plate members are moved to the end of the channel members, they may be turned outwardly to a non-engaging position, as clearly shown in Fig. 9 of the drawing. This permits the wheels of the vehicle to be run into position, and then the plate is turned into engaging position and moved until the shoe engages the wheel. The edges of the plate are then under the locking members, see Figs. 7 and 8 of the drawings. Holding means is provided for each wheel in the form of the arm 44 extending over the sides of the channel iron member which may be slid along bar 40 to fit the particular wheel-base, and having the flexible member 45 connected at one end, the other end of which is connected to the adjusting member 46 mounted in the sliding holding member 47.

The raising and supporting means are securely held in their raised position by brace members extending and secured to the sides of the car, these brace members including the flexible chains 48 which are connected to the rods 49 on the sides of the car and extend thereacross, passing through the aperture 36 on the web 35 of the shoe 34, and having the tension regulating means 50. Hook 51 is used for shortening chain 48 to facilitate adjustment of its length. Additional flexible bracing means 52 are also secured to the sides of the car and by means of hooks 53 to the extensions 54 of the transverse brace members 55 which connect the associated pairs of supporting members, see particularly, Figs. 2 and 3.

Means is also provided in the bottom of the car for securely holding and bracing the lower tier of vehicles, and includes the supporting plate members 56 secured to the floor of the car over the recess 57 and having the elongated slot 58 to slidably receive the adjusting and holding bolt 59 which passes through the horizontal extension 60 of the shoe member 61 which is of arc-shaped conformation to engage a portion of the wheel and has the curved flanges 62 to assist in holding. These shoe members 61 are connected to the sides of the car by the flexible brace members 63, which are similar to those described previously for bracing the suspended vehicle.

Referring now to Figs. 12 to 15, inclusive, which show slight modifications in the structure of the holding means, for the lower tier of vehicles, 64 designates the shoe corresponding to shoe 51 previously described, having the supporting plate member or base 65 and provided with the bolts 66 having the locking heads 67 spaced therefrom and arranged to fit and slide in the slots 68 in the plate 59 set in the floor of the car. The holding means takes the form of the flexible member 70 having the buckle connection 71, these flexible members also having the loop members 72 each provided with the enlarged head 73 to fit into the slot 68 and which cannot be removed from the floor plate. The bolt heads are larger than the slots or openings so that they cannot be taken out or stolen. They necessarily will have to be put in before the floor plate is bolted down. By this means the wheel may be securely held in any position as the shoe and the holding means may both be adjusted, as desired.

Figs. 16, 17 and 18 show a slightly different form of holding construction for the raised or suspended vehicles and one which utilizes the angle iron holding members 41, as previously shown and described. The shoe 74 has the extended plate or base 75 slidable in the channel shaped member 27 under the angle iron members 41, and held in position by means of the jam bolts 76. The holding means includes the clips 77 and the flexible connecting means 78, which are connected together by means of the buckle 79. These clips 77 may be slid along the whole length of the angle irons 41 to fit the wheel base and cannot be removed from channel on account of bolts not shown which are secured in the flanges 41.

What we claim is:—

1. In combination in a car, a plurality of supporting members each arranged to receive and support one side of a vehicle for storing and transportation, lifting means on one side of the car and connections extending from said lifting means to said supporting members, whereby, when the lifting means is actuated, the vehicle will be raised within the car.

2. In combination in a car, a plurality of supporting members each arranged to receive and support one side of a vehicle for storing and transportation, lifting means on each side of the car and connections from each of said lifting means to the same ends of both of said supporting members, whereby when said lifting means is actuated, the same ends of the supporting members will be raised simultaneously.

3. In combination in a car, a plurality of supporting members each arranged to receive and support one side of a vehicle for storing and transportation, lifting means on one side of the car and connections extending from said lifting means to said supporting members, whereby, when the lifting means is actuated, the vehicle will be raised within the car, said lifting means including a shaft rotatably mounted with means for rotating the same, a driven shaft having connections with said shaft and having a pair of sprockets thereon, said connections being in the form of chains or links adapted to engage said sprockets.

4. In combination in a car, a plurality of supporting members each arranged to receive and support one side of a vehicle for storing and transportation, lifting means on one side of the car and connections extending from said lifting means to said supporting members, whereby, when the lifting means is actuated, the vehicle will be raised within the car, and additional means for supporting said supporting members in raised position.

5. In combination in a car, a plurality of supporting members each arranged to receive and support one side of a vehicle for storing and transportation, lifting means on one side of the car, a plurality of pulleys supported from the roof of the car, one above each of said supporting members, and flexible connections extending from said lifting means over said pulleys to the ends of said supporting members, whereby when said lifting means is actuated, the supporting members will be raised and lowered in unison.

6. In combination in a car, a plurality of supporting members each arranged to receive and support one side of a vehicle for storing and transportation, lifting means on one side of the car and connections extending from said lifting means to said supporting members, whereby, when the lifting means is actuated, the vehicle will be raised within the car, and bracing means connected to said supporting members and to the sides of the car.

7. In combination in a transporting vehicle, a supporting member, means for raising and lowering said supporting member within the vehicle, a holding member mounted on said supporting member and adapted to be moved into and out of engagement with the wheel of a vehicle.

8. In combination in an apparatus of the character described, a supporting member, means for raising and lowering said supporting member, a holding member mounted on said supporting member and adapted to be moved into and out of engagement with the wheel of a vehicle, and additional holding means adapted to engage the wheel of a vehicle.

9. In combination in an apparatus of the character described, a supporting member of channel shape, with the flanges extending upwardly, locking members extending along the sides of said channel supporting member for a portion of its length, a holding member including a shoe for engaging the wheel of the vehicle movably mounted within said channel supporting member and adapted to be moved under said locking members.

10. In combination in an apparatus of the character described, a supporting member of channel shape, with the flanges extending upwardly, locking members extending along the sides of said channel supporting member for a portion of its length, a holding member including a shoe for engaging the wheel of the vehicle movably mounted within said channel supporting member and adapted to be moved under said locking members, and means for mounting said holding member so that when in unlocked position under said locking members, it may be swung to a non-operative position.

11. In combination in an apparatus of the character described, a supporting member of channel shape, with the flanges extending upwardly, locking members extending along the sides of said channel supporting member for a portion of its length, a holding member including a shoe for engaging the wheel of the vehicle movably mounted within said channel supporting member and adapted to be moved under said locking members, and means for mounting said holding member so that when in unlocked position under said locking members, it may be swung to a non-operative position, said mounting means including a shaft along the side of said channel member, arms slidably mounted on said shaft and detachably connected to said holding member.

12. In combination in an apparatus of the character described, a supporting member, a holding member movably mounted on said supporting member, and arranged to be locked against removal in certain positions.

13. In combination in an apparatus of the character described, a supporting member, a holding member movably mounted on said supporting member, and arranged to be locked against removal in certain positions, said holding member including a shoe portion adapted to engage the wheel of a vehicle, and an extended base portion.

14. In combination in an apparatus of the character described, a supporting member, means for raising and lowering said supporting member, a holding member mounted on said supporting member and adapted to be moved into and out of engagement with the wheel of a vehicle for holding the same and additional holding means adjustably mounted on said supporting member, and adapted to engage the wheel of a vehicle.

15. In combination in an apparatus of the character described, a supporting member, means for raising and lowering said supporting member, a holding member mounted on said supporting member and adapted to be moved into and out of engagement with the wheel of a vehicle for holding the same, and additional holding means adjustably mounted on said supporting member, and adapted to engage the wheel of a vehicle, said additional holding means comprising a pair of members slidably connected to said supporting member and having a detachable and flexible connection with each other.

16. In combination in an apparatus of the character described, a supporting member having locking members extending along the sides thereof, a holding member adjustably and movably mounted on said supporting member and having means for engaging the wheel of the vehicle, said holding member being adapted to be moved under said locking members, and an additional holding member slidably secured to said supporting member and locking members, and adapted to engage the wheel of the vehicle.

17. In combination in an apparatus of the character described, a supporting member having locking members extending along the sides thereof, a holding member adjustably and movably mounted on said supporting member and having means for engaging the wheel of the vehicle, said holding member being adapted to be moved under said locking members, clamp members slidably connected to said supporting member and locking members and detachable flexible means connected thereto and adapted to engage the wheel of the vehicle.

18. In combination in an apparatus of the character described, a supporting member, locking members secured to said supporting members, a holding member movably mounted on said supporting member and also having a pivotal relation thereto, said holding member including means to engage the wheels of a vehicle, and an extended base portion adapted to be positioned under the locking members to hold the wheel of the vehicle, said holding member being adapted to be moved to an open position when the extended base portion is out of engagement with said locking members.

19. In combination in an apparatus of the character described, a supporting member, locking members secured thereto and extending therealong for a portion of its length, a holding member including means for engaging the wheels of a vehicle, movably mounted on said supporting member and having parts adapted to be moved under said locking members, a shaft for slidably and pivotally supporting said holding member so that it may be swung to an open or non-operative position when said holding member is out of engagement with said locking members.

20. In an apparatus of the character described, including in combination, a car having a floor, a recess provided in the floor, a plate secured over said recess and provided with a slot, and a shoe member having a part adapted to engage the wheel of a vehicle to be held within the car and also having an extended base portion, and securing means adjustably connecting said extended base portion to said plate by means of said slot.

21. In an apparatus of the character described, including in combination, a car having a floor, a recess provided in the floor, a plate secured over said recess and provided with a slot, and a shoe member having a part adapted to engage the wheel of a vehicle to be held within the car and also having an extended base portion, a securing means adjustably connecting said extended base portion to said plate by means of said slot, and transverse brace members connected to the sides of the car and to said shoe member.

22. In an apparatus of the character described, including in combination a car having a floor provided with a recess, a plate covering said recess and provided with a plurality of slots, a shoe member adapted to engage the wheel of a vehicle to hold the same in a car and having an extended base portion, securing means adjustably connecting said base portion to said plate member by means of said slots, and additional holding means mounted in said slots adapted for attachment to the wheels of said vehicle.

23. In an apparatus of the character described, including in combination a car having a floor provided with a recess, a plate covering said recess and provided with a plurality of slots, a shoe member adapted to engage the wheel of a vehicle to hold the same in a car and having an extended base portion, securing means adjustably connecting said base portion to said plate member by means of said slots, and additional holding means mounted in said slots adapted for attachment to the wheels of said vehicle, said additional holding means comprising a member slidable in each slot and having flexible means provided with complementary fastening devices adapted to engage the wheel of the vehicle.

CORA M. DALY,
RAYMOND J. DALY,
MARION DALY,
*Heirs-at-law of John M. Daly, deceased.*